US012541119B2

(12) United States Patent
Kerner et al.

(10) Patent No.: US 12,541,119 B2
(45) Date of Patent: Feb. 3, 2026

(54) SYSTEM AND METHOD FOR THE ORDER-RECEIPT PROCESSING AND PRODUCTION OF EYEGLASS LENSES

(71) Applicant: Rodenstock GmbH, Munich (DE)

(72) Inventors: Patrick Kerner, Oberhaching (DE); Martin Zimmermann, Erdweg-Kleinberghofen (DE); Andrea Heigl, Munich (DE); Leonhard Schmid, Diessen am Ammersee (DE)

(73) Assignee: Rodenstock GmbH, Munich (DE)

( * ) Notice: Subject to any disclaimer, the term of this patent is extended or adjusted under 35 U.S.C. 154(b) by 380 days.

(21) Appl. No.: 18/263,186

(22) PCT Filed: Jan. 25, 2022

(86) PCT No.: PCT/EP2022/051617
§ 371 (c)(1),
(2) Date: Jul. 27, 2023

(87) PCT Pub. No.: WO2022/161944
PCT Pub. Date: Aug. 4, 2022

(65) Prior Publication Data
US 2024/0095797 A1 Mar. 21, 2024

(30) Foreign Application Priority Data

Jan. 29, 2021 (DE) .......................... 102021000451.5

(51) Int. Cl.
*G02C 7/02* (2006.01)
*G06Q 30/0601* (2023.01)
(52) U.S. Cl.
CPC ......... *G02C 7/027* (2013.01); *G06Q 30/0603* (2013.01); *G06Q 30/0621* (2013.01)

(58) Field of Classification Search
None
See application file for complete search history.

(56) References Cited

U.S. PATENT DOCUMENTS

2005/0122472 A1\* 6/2005 Fisher ..................... G02C 7/02
351/159.73

FOREIGN PATENT DOCUMENTS

| DE | 10140656 A1 | 3/2003 |
| EP | 2506063 A1 | 10/2012 |
| EP | 2600186 A1 | 6/2013 |

OTHER PUBLICATIONS

May 24, 2022 (PCT) International Search Report and Written Opinion.

\* cited by examiner

*Primary Examiner* — Robert E. Tallman
(74) *Attorney, Agent, or Firm* — Banner & Witcoff, Ltd.

(57) ABSTRACT

System for order-receipt processing of an eyeglass lens, including: a receiver configured to receive order data of eyeglass lens, to store a catalog of eyeglass lens classes, which each are defined by a fixed number of predetermined and freely selectable order parameters and differ from each other in the number of freely selectable order parameters, and to classify the order data on the basis of the catalog of eyeglass lens classes, a processor configured to process the order data, to store only the highest eyeglass lens classes of the catalog of eyeglass lens classes, to select one of the highest eyeglass lens classes, to match the order data to the selected highest eyeglass lens class, to generate a respective digital reproduction of the eyeglass lens based on a calculation model and the adapted order data, and a communication device connecting the receiver and the processor.

20 Claims, 5 Drawing Sheets

SYSTEM AND METHOD FOR THE ORDER-RECEIPT PROCESSING AND PRODUCTION OF EYEGLASS LENSES

TECHNICAL FIELD

The present invention relates to a system and method for order-receipt processing and manufacturing of eyeglass lenses.

BACKGROUND

The manufacturing process of an eyeglass lens from the determination of ametropia of a user of an eyeglass lens to the production of the actual eyeglass lens is nowadays very complex due to the multitude of different lens types, materials, individualization options, etc. The systems and processes used have a high degree of decentralization and are highly interdependent. An example of a conventional distributed system and method is described in WO 2017/102003 A1.

SUMMARY

Therefore, it is an object of the present invention to provide a system and method for order-receipt processing and manufacturing, whereby eyeglass lenses can be manufactured more efficiently, in particular more easily, accurately and economically, and maintenance operations can be simplified.

A first aspect according to the invention relates to a system for order-receipt processing of at least one eyeglass lens, such as a system for order-receipt processing of one eyeglass lens, a pair of eyeglass lenses, or a plurality (for example, a batch) of eyeglass lenses. The system comprises:
  a receiving unit for receiving order data of at least one eyeglass lens, wherein a catalog of eyeglass lens classes is stored in the receiving unit, which each are defined by a fixed number of predetermined and freely selectable order parameters and differ from one another in the number of freely selectable order parameters, wherein the receiving unit is configured to classify the order data on the basis of the catalog of eyeglass lens classes, and
  a processing unit for processing the order data, wherein only the highest eyeglass lens classes of the catalog of eyeglass lens classes are stored in the processing unit, wherein the processing unit is configured to select one of the highest eyeglass lens classes, to adapt the order data to the selected highest eyeglass lens class, and to generate a respective digital reproduction of the at least one eyeglass lens based on a calculation model and the adapted order data, and
  a communication device which connects the receiving unit and the processing unit or which is configured to enable data exchange between the receiving unit and the processing unit.

Advantageously, the system according to the first aspect of the invention enables orders for eyeglass lenses to be processed more easily and with less effort, that is, more cheaply and with less consumption of resources. In this case, resources in particular refer to the storage space for data relevant to the order-receipt processing of the eyeglass lenses, such as different eyeglass lens classes. Further advantageously, the system according to the first aspect according to the invention has a minimum of decentralization, so that maintenance of the system is more efficient, in particular simpler.

The system according to the first aspect of the invention comprises the two units: receiving unit and processing unit, each of which are in signal communication with the other. The receiving unit and processing unit are connected via a communication device that enables the exchange of data (for example, via a communication network). The communication device may comprise, for example, a communication network (network). The data may be exchanged or transmitted from one unit to another via the communication device using XML, JSON or another suitable format, for example. The units may also communicate with each other via the communication device (such as via the network) by remote procedure calls.

If a person needs a pair of glasses for the correction of ametropia, the order parameters of the eyeglass lenses, or of the eyeglass lenses, of the glasses for the correction of ametropia are conventionally determined by an optician and/or machine-supported. The order parameters include, for example, the product name and the refraction values, such as sphere (in diopters) and/or cylinder (in diopters), the axis position and/or the prism (magnitude and base) for distance and/or near and/or an addition and/or data of the measuring glasses used to determine the refraction values for distance and/or near, such as the position in front of the eye and the optical effect of the measuring glasses used. The order parameters may further include individual parameters of the eyeglass wearer and/or the position of use of the glasses and/or the geometric shape of the frame and/or the centering and/or parameters for controlling the design variations and/or the use of the glasses and/or the product design and/or services and/or biometric property of the eye or eyes of the prospective wearer, etc. Exemplary individual parameters include frame lens angle, pre-tilt, pupil distance, corneal vertex distance, etc. Example product designs include lens colors, lens tints, lens coatings, etc. Example services include obtaining insurance for the glasses or financing, whether the eyeglass lenses should be rounded to the specific frame, whether the eyeglass lenses should be centered in the specified glasses, etc. Biometric properties describing the eye are for example. Wavefront errors including higher orders (for example as Zernike coefficient set), pupil sizes and/or positions at different view directions, eye length, curvatures and positions of the refractive surfaces of the eye, refractive index of the media, etc.

Once the order parameters have been determined, they are transmitted to the system according to the first aspect of the invention and are received or obtained by the receiving unit in the form of order data.

The receiving unit classifies the received order data based on the catalog of eyeglass lens classes stored in the receiving unit. The catalog can be stored, for example, in the form of a computer-readable list. The eyeglass lens classes differ in the quantity or number of order parameters which can be freely selected and/or individualized and are taken into account in the calculation of the eyeglass lens. The eyeglass lens classes can in particular reflect different individualization levels of the eyeglass lens. An eyeglass lens class can thus be defined in particular by the subset of freely selectable and/or individualizable order parameters. For example, a higher eyeglass lens class can be defined by a larger subset of freely selectable and/or individualizable order parameters than a lower eyeglass lens class. The freely selectable and/or individualizable order parameters assigned to each eyeglass lens class can also be stored in the catalog (for example in the form of a list).

In the case of a single vision lens, a first (the lowest) eyeglass lens class may contain only refraction values or refraction parameters, such as sphere and/or cylinder with axis position and/or prism with axis position. A second, higher eyeglass lens class can, in addition to the refraction values, also contain further individual parameters of the wearer and/or the position of use, such as pupil distance, corneal vertex distance, frame lens angle, frame shape, etc. A third, even higher class of eyeglass lenses can also contain further individualization parameters, such as biometric properties of the eye, etc., in addition to the previously mentioned individual parameters.

The division into eyeglass lens classes for single vision lenses or multifocal lenses can be similar to the division into eyeglass lens classes for progressive lenses.

A first eyeglass lens class can, for example, in the case of a progressive lens, only contain refraction values or refraction parameters, such as sphere and/or cylinder with axial position and/or prism with axial position and/or addition. A higher eyeglass lens class can, in addition to the refraction values, also contain further individual parameters of the wearer and/or the position of use, such as pupil distance, corneal vertex distance, frame lens angle, frame shape, etc. An even higher class of eyeglass lenses may also contain further individualization parameters in addition to the previously mentioned individual parameters, such as parameters for controlling the design variations and/or biometric characteristics of the eye and/or the use of the glasses, etc.

In the case of a multifocal lens, a first eyeglass lens class may also contain only refraction values or refraction parameters, such as addition, sphere and/or cylinder with axis position and/or prism with axis position. A higher eyeglass lens class can, in addition to the refraction values, also contain further individual parameters of the wearer and/or the position of use, such as pupil distance, corneal vertex distance, frame lens angle, frame shape, etc. An even higher class of eyeglass lenses may also contain further individualization parameters, such as use of the glasses, and/or biometric properties of the eye, etc., in addition to the previously mentioned individual parameters.

The receiving unit can check whether the transmitted order data contain the parameters of an eyeglass lens class to be selected and classify the order data accordingly into an eyeglass lens class. The classification can also be made on the basis of other order parameters.

For example, the receiving unit may be configured to classify and cleanse the order data if the order data contain certain parameters not allowed for the at least one eyeglass lens by the catalog of eyeglass lens classes. The order data may be cleansed, for example, by in particular removing the not allowed parameters. Not allowed parameters may be, for example, parameters that are not allowed, not selectable or not individualizable for a particular ordered eyeglass lens class. An example of not allowed order parameters are individual parameters (such as pupil distance, corneal vertex distance, etc.) for a non-individualized product. Other examples are specific lens materials and/or coatings.

Advantageously, this embodiment makes it possible to reduce memory consumption and data traffic in the system.

The receiving unit then hand-over the classified order data to the processing unit via the communication device. Only the highest eyeglass lens classes, for example the highest eyeglass lens classes for one of different product categories, such as single vision, progressive, multifocal, near comfort lenses, etc., are stored in the processing unit. Several highest eyeglass lens classes may be necessary, for example, because different product categories usually cannot be created from one eyeglass lens class. The highest eyeglass lens class (for a specific product category) is the eyeglass lens class with the largest number of order parameters to be determined (for example, freely selectable or individualizable). The classified order data is adapted to one of the highest eyeglass lens classes by the processing unit if the classified order data corresponds to a lower eyeglass lens class.

The processing unit can adjust the order data that has been assigned to an eyeglass lens class to the selected highest eyeglass lens class by populating the parameters of the highest eyeglass lens class that have not been determined in the ordered eyeglass lens class with default values or by extending the missing order parameters of the highest eyeglass lens class and the default values for the missing parameters to the ordered eyeglass lens class.

Advantageously, this embodiment makes it possible that only a highest eyeglass lens class and, if necessary, the parameters required for the extension of the order data have to be created within the processing unit for several eyeglass lens classes.

The adapted order data, if any, is then processed so that the processing unit generates a digital reproduction of the ordered eyeglass lens based on this order data. The digital reproduction can be, for example, a simulation of the eyeglass lens and/or a theoretical eyeglass lens. In this case, the processing unit uses a calculation model that can be stored or saved in the processing unit. The processing unit thus processes the received and classified order data.

For example, the receiving unit and the processing unit may each comprise their own data memories. Preferably, the receiving unit and the processing unit are units that operate independently of each other.

Advantageously, this embodiment allows the system to have a low level of complexity and a low level of decentralization, which simplifies system maintenance and verification.

The receiving unit and the processing unit can each be independent computer units, each comprising one or more processors. However, the receiving unit and the processing unit can also be integrated side by side in a computer unit comprising one or more processors.

The calculation model, with the help of which a digital reproduction of the eyeglass lens is created, can have a modular structure and comprise several (that is, at least two) modules that are independent of one another. The individual modules may, for example, be configured, modified and/or implemented independently of each other. The modular structure of the calculation model makes it possible to improve the reusability of the calculation model for different products.

For example, the calculation model may consist of at least four independent modules, wherein the at least four independent modules may comprise the modules including design, eye model, calculation type, and material. In particular, the calculation model may consist of exactly the four independent modules including design, eye model, calculation type and material. This division has proven to be advantageous with regard to the reusability and flexibility of the calculation model.

The design describes the optical design of an eyeglass lens and may include at least one quantity and/or calculation rule relevant to the optical design. The design may also be modular. For example, the design may be further subdivided into the (dependent) sub-modules basic design and (optionally) design expression. It is also possible to combine the basic design and the design specification in one module.

The basic design may be composed of or comprise the parameters relevant to the optical design, such as the description of a selection of the front and/or rear surface, and/or the description of the front and/or rear surface, and/or the positions of the design points (for example, far and/or near reference points), and/or the object distance model given as a function of the lens coordinates, and/or the design variability represented, for example, by means of a design polygon, and/or the design refractive error given as a function of the lens coordinates. The design polygon is described in document EP 10 702 822 A, the contents of which are hereby incorporated into the present description. The design refractive error is described in document EP 1 658 522 B1, the contents of which are hereby incorporated into the present description.

The description of the selection of the front and/or back surface can determine the method by means of which the system determines the front surface—and/or back surface from the order data, for example from the refraction data (sphere, cylinder, etc.) or for example lens target values and material index of the eyeglass lens.

Here, the lens target values are the optical target values (sphere, cylinder, axis, prism, base) to be set in the glass to produce the desired correction for the given object distance and the refraction data. For example, the determination of the front and/or back surface according to a known base curve system can be a description of the selection of the front and/or back surface. The base curve system may be stored in a suitable format (for example, in the form of a table). Generally, the front surface is selected. Accordingly, the basic design may include a description of the selection of the front surface, for example according to a known basic curve system.

The description of the front surface or the data of the front surface may contain the surface representation of the front surface: for spherical front surfaces the curvature, for non-spherical front surfaces a suitable parameterization by for example spline coefficients. For front surface progressive lenses, the optical design may be contained in the front surface in whole or in part.

The system can determine the selection of the back surface from the order data, for example the refraction data or the eyeglass lens target values and the material index of the eyeglass lens as explained above for the selection of the front surface.

For example, a pre-optimized surface and/or target functions can be selected to optimize the back surface. The pre-optimized surface/start geometry and/or the target functions may carry all or part of the information of the optical design.

The pre-optimized surfaces can contain the position and orientation to the front surface as well as their surface representation. The position and orientation to the front surface can be given or determined for example by a rotation and translation. A suitable representation for the surface representation may be given, for example, by spline coefficients, polynomial coefficients, curvatures, etc.

The design points (for example, far and/or near reference point, centering point, etc.) can be selected to match the optical design defined in the front and/or back surface and the object distance model. For example, their location can be defined on the front surface with respect to the center of the lens or the main optical line of sight. Other coordinate systems are also possible.

The design specification determines a specific specification of the basic design. The default values or standard values of the order data that change the design are optionally included in the design specification. These include, for example, the main viewing distances and the design parameters, as described in document EP 10 702 822 A, if the basic design includes the design variability of a design polygon.

Furthermore, it can be defined whether and how the position of the design points may change with respect to the position defined in the basic design, for example with the help of the design triangle or adapted to the setting. In addition, it can be advantageous to define the final position of the design points if, for example, a fixed design is to emerge from a variable design. The design adjustments encompassed by the design expression may be accomplished by known methods. Exemplary design adaptation methods are stretching/swinging, grasp-optimized DN, object distance superposition, etc., as described, for example, in document WO 2008/089996 A1, the contents of which are hereby incorporated into the present description.

The eye model describes how the target values of the eyeglass lens are determined. Here, the choice of the calculation rule, for example concave apex measurement position or position of use, can be output. In the position of use, the default values or standard values for the individual parameters, frame lens angle, pre-tilt, pupil distance (PD), corneal vertex distance can optionally be defined.

Furthermore, the modeling of the eye and the necessary parameters of the eye can be defined in the position of use. The eye model may include, for example, whether the adjustment astigmatism should be taken into account and, if necessary, the relevant variables (such as the position of the main planes of the eye), whether listing distance or listing proximity should be taken into account in the calculation, or whether default or standard values should be taken into account for the biometric properties of the eye, for example. The listing rule is described in documents EP 2356507 B1 and DE 10 2008 057 206 A1, the contents of which are hereby incorporated into the present description.

The calculation type describes the type and/or quality of the calculation of the actual values of the eyeglass lens.

It can be specified here whether the lens is to be optimized according to the target functions from the design and/or whether the lens is to be fully corrected in specified points. The degree of optimization can also be specified in the optimization, for example whether only the spherical portion of the target values should be optimized by compensating the base curve effect or whether the complete target values should be optimized.

Optionally, a type of check of the calculated lens can be specified in the calculation type and/or whether to further restrict the selection of the base curve whose selection system was determined in the design. The type of check is a description of what check should be performed on the calculated lens and what action should be taken if the check fails. For example, the glass or lens thickness can be checked against the minimum thickness specifications and further calculation iteration can be performed if a certain deviation is found. The restriction of the base curves can be advantageous, for example, for eyeglass lenses that have not been optimized over their entire surface, since this can minimize the base curve effect.

For optimized simulations, there is no loss of quality of the lens even with larger deposits of the base curve, so that it can be advantageous to allow for a larger blank range in case of possible stock bottlenecks.

The material describes the properties of the eyeglass lens material to be used, for example, refractive index, density, Abbe number.

For the optical calculation, primarily only the refractive index for chromatic aberrations can be specified, but also the Abbe number. The density can be specified optionally, for example, when determining the weight of the eyeglass lens. With the help of another optional attribute of the eyeglass lens use, for example universal progressive lens, sports lens or safety lens, the thickness specification can be determined from the material, so that with these specifications the eyeglass lens meets, for example, the static load tests of the ISO standard.

The calculation model may also comprise more or less than the modules described above. For example, it is possible to combine two or more of the modules described above. For example, the eye model and calculation type modules and/or the design and material modules can be combined. Furthermore, it is possible to configure the individual sub-modules as independent modules. Furthermore, it is possible to combine all of the modules described above in one module.

The calculation model with the individual modules can, for example, be stored in a database, which can be part of the processing unit.

Based on the calculation model, the digital reproduction can be generated. In one example, a digital reproduction can first be generated in an approximating manner. The approximate generation of the digital reproduction can be used to select a blank for the ordered eyeglass lens from a catalog of blanks.

Subsequently, using the selected blank and its characteristics, such as lens boundary, a new, accurate generation of the digital reproduction can be performed.

For example, the order data can be assigned to the calculation model. The calculation model can be one of many calculation models that can be stored in the processing unit.

For example, the calculation model for a simple single vision lens can be composed of the following components: a calculation type in which no planar optimization is performed and a torus superposition is performed in far reference point (BF), so that in concave vertex measurement position the target values are set; a basic design in which the reference points (for example BF, prism reference point (BP)) are identically defined, the object distance is constant, no design variations are allowed over the design polygon, the design refraction error is constant, a basic curve system is specified for the front surface, and a specification is given for the start geometry of the back surface; a design expression in which no variation of the design points is allowed; and an eye model with concave vertex measurement value position.

For example, the calculation model for an optimized single vision lens with consideration of the biometric properties of the eye can be composed of the following modules: a calculation type in which a planar optimization and a torus superposition are performed in BF so that the target values are set in the position of use; a basic design in which the reference points (for example, BF, BP) are identically defined, the object distance is constant, no design variations are allowed over the design polygon, the design refractive error is constant, a base curve system is specified for the front surface, and a default is given for the starting geometry of the back surface and selection of the target function for the optimization of the back surface; a design expression where no variation of the design points is allowed; and an eye model for position of use with default values for corneal vertex distance, frame pre-tilt, frame disc angle, pupil distance (PD) and default values for the biometric properties of the eye.

For example, the calculation model for an optimized progressive lens with fixed progression taking into account the biometric properties of the eye can be composed of the following modules: a calculation type in which a planar optimization and a torus overlay in BF and near reference point (BN) are performed so that in position of use the target values are set; a basic design in which the reference points are defined, design variations over the design polygon are allowed, the design refractive error according to the product description is given, a base curve system for the front surface is given, and a specification for the start geometry of the back surface analogous to a base curve system as well as the selection of the target function for the optimization of the back surface is given; a design expression with variation of the design points to obtain fixed progression; and an eye model for position of use with default values for corneal vertex distance, frame pre-tilt, frame disc angle, PD as well as default values for the biometric properties of the eye, where the calculation takes into account the setting astigmatism and the Listing rule for proximity.

By means of a set of rules, the order data can be analyzed within the processing unit and referenced to the calculation model. The set of rules may include, for example, a rule file in which any logical operations are defined, a self-defined domain-specific language (DSL), decision trees or tables. The set of rules may further have a simple table structure that unambiguously maps the calculation model to the individual modules (such as the four modules of design, eye model, calculation type, and material).

It is also possible to perform a complex transformation of the ordered eyeglass lens and/or order data. An example of a transformation is the conversion of a reading lens ordered with near refraction into a near comfort lens with distance refraction and addition.

A second aspect according to the invention relates to a system for calculating at least one eyeglass lens of a pair of glasses, comprising:
    the system according to the first aspect, and
    a calculation unit, wherein a catalog of blanks is stored in the calculation unit, wherein the calculation unit is configured to calculate the at least one eyeglass lens based on at least one blank from the catalog of blanks and the respective digital reproduction,
    wherein the communication device connects the receiving unit, the processing unit, and the calculation unit and enables data exchange between the units.

A third aspect according to the invention relates to a system for manufacturing at least one eyeglass lens, comprising:
    the system according to the first or second aspect according to the invention, and
    a production unit, wherein a catalog of blanks and a list of manufacturing parameters are stored in the production unit, wherein the production unit is configured to manufacture the at least one eyeglass lens using at least one blank from the catalog of blanks, the list of manufacturing parameters, and the respective digital reproduction, and
    wherein the communication device connects the receiving unit, the processing unit and the production unit and enables data exchange between the units.

Advantageously, the systems according to the second and third aspects of the invention enable eyeglass lenses to be calculated and manufactured more simply and yet more accurately with less effort, i.e. more cost-effectively and with less consumption of resources. In this case, resources refer to in particular the storage space of the data relevant for the manufacture of the eyeglass lenses, such as different eyeglass lens classes. Further advantageously, the systems according to the second and third aspects of the invention have a minimum of decentralization, so that maintenance of the systems is more efficient, in particular simpler.

All features, embodiments and advantages described with respect to the system according to the first aspect of the invention, as well as all explanations given, in particular with respect to the receiving unit, the communication device, the processing unit and the calculation model, also apply to the systems according to the second and third aspects of the invention.

In addition, the system according to the second aspect according to the invention comprises the calculation unit connected to the processing unit via the communication device. The system according to the third aspect according to the invention comprises the production unit connected to the processing unit via the communication device.

In the calculation unit and/or production unit, all characteristic data of the existing blanks, i.e. the eyeglass lens blanks, may have been stored. Examples are the contour of the lens boundary, the position of the front and rear surfaces relative to each other and/or the material of the blank. Further, manufacturing parameters, which may include, for example, the positions of the engravings and stamps, and manufacturing constraints, may have been stored in the production unit. Manufacturing restrictions can be, for example, that certain lens geometries and/or materials cannot be processed by the production unit.

Via the communication device, which may comprise a network, the digital reproduction is transferred from the processing unit to the calculation unit and/or to the production unit, for example, using XML, JSON, or another suitable format. The units may also communicate with each other via the communication device (such as via the network) by remote procedure calls.

The production unit then produces the ordered eyeglass lens based on the generated digital reproduction of the eyeglass lens from one of the available blanks, taking into account the manufacturing parameters.

For example, both the calculation unit and the production unit may comprise their own data memory. Preferably, both the calculation unit and the production unit are units that operate independently of the receiving unit and the processing unit.

Advantageously, these embodiments allow the respective system to have a low level of complexity and a low level of decentralization, which simplifies the maintenance of the respective system.

The calculation unit and/or the production unit may each be a stand-alone computer unit or may comprise such computer unit. The computing unit may comprise one or more processors. However, the calculation unit and/or the production unit can also be integrated along the receiving unit and/or the processing unit in a computer unit that comprises one or more processors.

For example, the production unit may include a plurality of manufacturing means for manufacturing the at least one eyeglass lens according to the respective digital reproduction. Exemplary manufacturing means are grinding machines, polishing machines, blocking devices, and so on.

For example, the processing unit may be further configured to select the at least one blank from the catalog of blanks based on the respective digital reproduction. For example, the processing unit may select the blank based on an approximated digital reproduction of the at least one ordered eyeglass lens (as described above).

From the approximated digital reproduction, the processing unit can select the blank for the eyeglass lens to be manufactured from the catalog of blanks in the production unit. Using the selected blank and its characteristics, such as lens boundary, the processing unit can then perform a new, accurate generation of the ordered eyeglass lens. After the new, accurate generation, the respective manufacturing parameters can then also be retrieved by the processing unit and the digital reproduction can be transferred via the communication device to the production unit for manufacturing the ordered eyeglass lens.

The production unit may also be a calculation unit or comprise a calculation unit, wherein the calculation unit manufactures the at least one eyeglass lens such that the calculation unit calculates the at least one eyeglass lens based on at least one blank from the catalog of blanks and the respective digital reproduction.

A fourth aspect according to the invention relates to a computer-implemented method for order-receipt processing of at least one eyeglass lens, wherein the method comprises the steps of:

receiving order data of at least one eyeglass lens, classifying the order data on the basis of a catalog of eyeglass lens classes, which are each defined by a fixed number of predetermined and freely selectable order parameters and differ from one another in the number of freely selectable order parameters, selecting one of the highest eyeglass lens classes, adapting the classified order data to the selected highest eyeglass lens class of the catalog of eyeglass lens classes if the eyeglass lens class of the classified order data is different from the selected highest eyeglass lens class, and generating a respective digital reproduction of the at least one eyeglass lens based on a calculation model and the adjusted order data.

Advantageously, the method according to the fourth aspect of the invention enables orders for eyeglass lenses to be processed more simply and with less effort, i.e. more cheaply and with less consumption of resources. In this case, resources refer to in particular the storage requirements of the data relevant for processing the order data of the eyeglass lenses, such as the different eyeglass lens classes.

For example, the method according to the fourth aspect of the invention may be performed by the system according to the first aspect of the invention. Accordingly, the foregoing described with respect to the system according to the first aspect according to the invention also applies to the method according to the fourth aspect according to the invention described below.

Further advantageously, the method according to the fourth aspect according to the invention has a minimum of decentralization, so that maintenance work of the system according to the first aspect according to the invention, by which the method can be carried out, is more efficient, in particular simpler.

For example, when a particular eyeglass lens has been ordered, the receiving unit of the first aspect according to the invention may receive the order data, classify the order data, and transmit the order data to the processing unit using XML, JSON, or another suitable format via the communication device.

For example, the receiving unit can classify the received order data based on the catalog of eyeglass lens classes stored in the receiving unit. The receiving unit can check whether the transmitted parameters correspond to the parameters defining an eyeglass lens class or whether the order data contains the parameters of an eyeglass lens class. The receiving unit can classify the order data into an eyeglass lens class.

The receiving unit can then transfer the classified order data to the processing unit via the communication device. The classified order data can be adapted by the processing unit to one of the highest eyeglass lens classes stored in the processing unit if the classified order data corresponds to a lower eyeglass lens class. The adapted order data, if any, may then be processed to allow the processing unit to generate a digital reproduction of the ordered eyeglass lens based on the order data. The digital reproduction can, for example, be a simulation of the eyeglass lens. In this case, the processing unit can make use of the calculation model already described, which can be stored in the processing unit.

Classifying may include cleansing the order data if the order data contains certain parameters not allowed by the catalog of eyeglass lens classes for the at least one eyeglass lens, as previously described. Cleansing may include, in particular, removing the not allowed parameters. Alternatively, the not allowed parameters may be identified as such, for example by means of a flag or other indicator.

Advantageously, this embodiment makes it possible to reduce memory consumption and data traffic.

Further, the method may comprise associating, for example in the processing unit, the classified order data with the calculation model. The calculation model may be one of many calculation models that may be stored in the processing unit. By means of a set of rules, for example within the processing unit, the order data may be analyzed and referred to the calculation model. The set of rules may include, for example, as described above, a rule file in which any logical operations are defined, a self-defined domain-specific language (DSL), decision trees or tables. The set of rules may further have a simple table structure that unambiguously maps the calculation model to the individual modules (such as the four modules of design, eye model, calculation type, and material).

Advantageously, a complex transformation of the ordered eyeglass lens and/or the order data can be performed by this embodiment. An example of a transformation is the conversion of a reading lens ordered with near refraction into a near comfort lens with far refraction and addition.

For example, adapting, e.g. in the processing unit, may include populating the classified order data with default values or extending the classified order data with default values.

Generating the digital reproduction, for example in the processing unit of the system according to the first aspect according to the invention, may also comprise approximate generation, as already performed for the system according to the first aspect according to the invention.

A fifth aspect according to the invention relates to a computer-implemented method for calculating at least one eyeglass lens of a pair of glasses, wherein the method comprises the method according to the fourth aspect and further comprises the steps of:
selecting at least one blank from a catalog of blanks, and
calculating the at least one eyeglass lens based on the at least one blank from the catalog of blanks and the respective digital reproduction, A sixth aspect according to the invention relates to a computer-assisted method for manufacturing at least one eyeglass lens, wherein the method comprises the method according to the fourth aspect according to the invention and the following steps:
selecting at least one blank from a catalog of blanks and retrieving a list of manufacturing parameters, and
manufacturing the at least one ordered eyeglass lens based on the respective digital reproduction, the at least one blank from the catalog of blanks, and the list of manufacturing parameters.

Advantageously, the methods according to the fifth and sixth aspects of the invention enable eyeglass lenses to be calculated and manufactured more simply and yet more accurately with less effort, i.e. more cheaply and with less consumption of resources. In this case, resources refer to in particular the storage space of the data relevant for the manufacture of the eyeglass lenses, such as different eyeglass lens classes.

Furthermore, the information described with respect to the method according to the fourth aspect, in particular with respect to advantages, features and embodiments, applies accordingly to the method according to the fifth aspect and according to the sixth aspect of the invention.

For example, the method according to the fifth aspect of the invention can be performed by the system according to the second aspect of the invention, whereas the method according to the sixth aspect of the invention can be performed by the system according to the third aspect of the invention. Therefore, the information described above with respect to the systems according to the second and third aspects of the invention also applies to the methods according to the fifth and sixth aspects of the invention described below.

Further advantageously, the methods according to the fifth and sixth aspects of the invention have a minimum of decentralization, so that maintenance work of the corresponding systems by which the methods can be carried out is more efficient, in particular simpler.

In the methods according to the fifth or sixth aspect of the invention, for example, the processing unit and/or the production unit may select one of the available blanks. The production unit may further retrieve the necessary manufacturing parameters. Alternatively, the processing unit may retrieve the necessary manufacturing parameters from the production unit via the communication device.

Via the communication device, which may comprise a network, the generated digital reproduction may be transmitted from the processing unit to the calculation unit and/or to the production unit by means of XML, JSON or any other suitable format, where the ordered eyeglass lens may be calculated or computed based on the generated digital reproduction of the eyeglass lens and one of the available blanks, or may be manufactured based on the generated digital reproduction of the eyeglass lens and from one of the available blanks, taking into account the manufacturing parameters.

For example, the at least one blank can be selected from the catalog of blanks based on the respective digital reproduction.

The manufacturing can also be only calculating of the at least one eyeglass lens based on the at least one blank from the catalog of blanks and the respective digital reproduction.

A seventh aspect according to the invention relates to a computer program product comprising computer-readable instructions that, when loaded, cause one or more processors to perform the method according to the fourth aspect according to the invention.

An eighth aspect according to the invention relates to a computer program product comprising computer-readable instructions that, when loaded, cause one or more processors to perform the method according to the fifth or sixth aspect according to the invention.

BRIEF DESCRIPTION OF THE DRAWINGS

The following is a description of the figures, which serve as an exemplary description of some embodiments of the claimed systems and methods. It is understood that individual features may be combined to form further embodiments.

The Figures show in.

DETAILED DESCRIPTION

Figure 1:
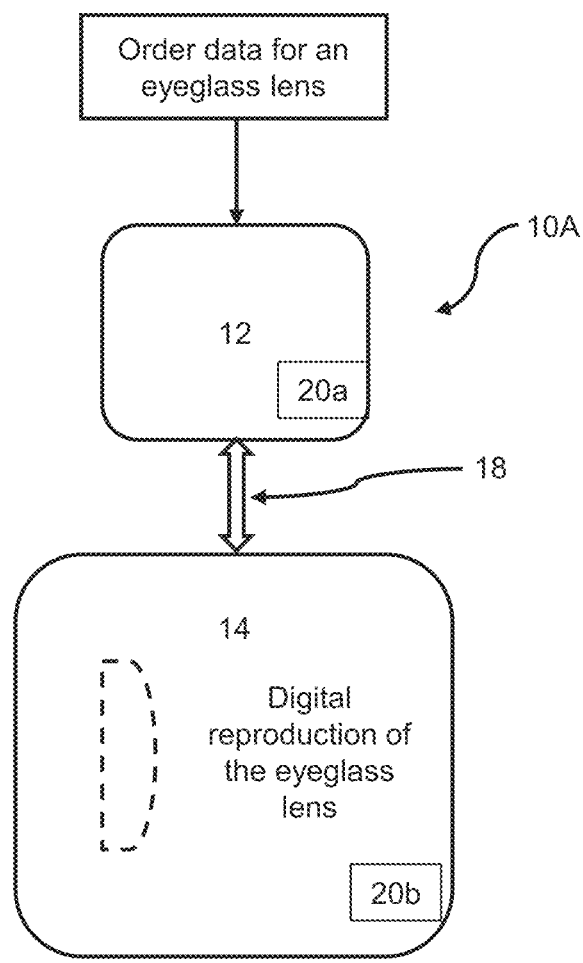
FIG. 1 an embodiment of the order-receipt processing system according to the first aspect of the invention, FIG. 2 an embodiment of the manufacturing system according to the third aspect of the invention, FIG. 3 an embodiment of the order-receipt processing method according to the fourth aspect of the invention, FIG. 4 an embodiment of the manufacturing method according to the sixth aspect of the invention, and FIG. 5 another embodiment of the manufacturing method according to the sixth aspect of the invention.

FIG. 1 shows a schematic representation of an embodiment of the order-receipt processing system according to the first aspect of the invention. The order-receipt processing system is configured to receive and process orders of at least one eyeglass lens, for example orders of one eyeglass lens, a pair of eyeglass lenses or any number of eyeglass lenses. The orders may include order data of the at least one eyeglass lens. The system 10A comprises the receiving unit 12 and the processing unit 14. The units 12 and 14 are connected to each other via the communication device 18, which connects the receiving unit 12 to the processing unit 14 for data exchange. The communication device 18 may comprise a network such as a LAN, a WLAN, a peer-to-peer network, or other communication network. The receiving unit 12 and the processing unit 14 of the illustrated embodiment of the system 10A each comprise their own storage unit, which may include their own data memory 20a and 20b. The receiving unit 12 comprises the data memory 20a and the processing unit 14 comprises the data memory 20b. The data memory 20a and 20b may be, for example, magnetic hard drives, solid-state hard drives, or other suitable data memory devices.

The data memory 20a of the receiving unit 12 stores a catalog of eyeglass lens classes comprising the eyeglass lens classes available in the system 10A and the parameters associated therewith. In contrast, the data memory 20b of the processing unit stores only the highest eyeglass lens classes (for example, the highest eyeglass lens class for single vision lenses, the highest eyeglass lens class for progressive lenses, the highest eyeglass lens class for multifocal lenses, the highest eyeglass lens class for near comfort lenses, etc.). The catalog of eyeglass lens classes may be stored, for example, in the form of a computer-readable list, table, or database. The eyeglass lens classes may also each be stored in the form of a computer-readable list, table, or other suitable data structure.

Incoming orders of an eyeglass lens, which include the order data of the eyeglass lens, are received at the receiving unit 12 and handed over via XML, JSON, or another suitable format to the processing unit 14, where the ordered eyeglass lens is generated as a digital reproduction based on a calculation model and the order data. The digital reproduction may be a simulation. If there are multiple ordered eyeglass lenses, a corresponding digital reproduction, which may be a simulation, may be generated for each lens.

The order data may include parameters such as refraction values or refraction data (sphere, cylinder, axis and/or prism), individual parameters such as pupil distance, corneal vertex distance, frame lens angle, pre-tilt, etc., and other parameters such as the product variant, lens type and/or shape and/or lens coloration, etc.

The calculation model, on the basis of which and on the basis of the order data transmitted by the receiving unit 12, the processing unit 14 generates or creates the digital reproduction, i.e. a simulation of the ordered eyeglass lens, can also be stored or saved in the data memory 20b.

Figure 2:
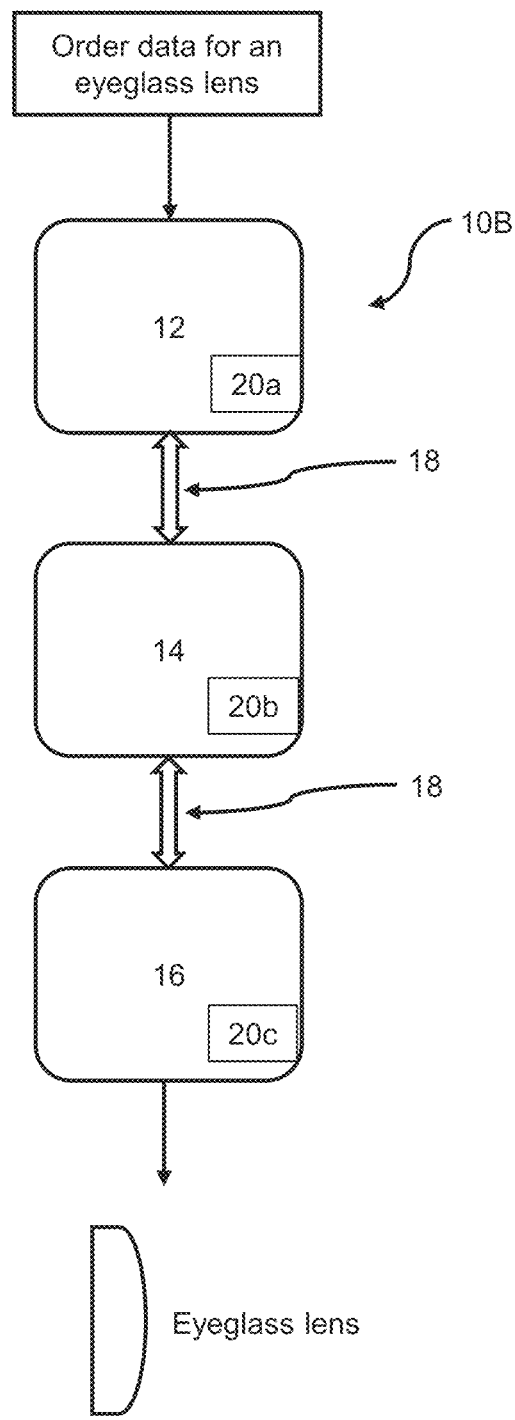

FIG. 2 shows a schematic representation of an embodiment of the manufacturing system according to the third aspect of the invention. The system 10B comprises the receiving unit 12, the processing unit 14 and the production unit 16, which additionally comprises the necessary manufacturing means such as grinding and polishing machines for manufacturing an eyeglass lens (not shown here). The units 12, 14 and 16 are connected to each other via the communication device 18 which connects the receiving unit 12 to the processing unit 14 and the processing unit 14 to the production unit 16 for data exchange. The communication device 18 may comprise a LAN, a WLAN, a peer-to-peer network, etc. The receiving unit 12, the processing unit 14, and the production unit 16 of the illustrated embodiment of the system 10B each comprise a dedicated storage unit or memory unit that may include a dedicated data memory 20a, 20b, 20c. The receiving unit 12 comprises the data memory 20a, the processing unit 14 comprises the data memory 20b, and the production unit 16 comprises the data memory 20c. The data memory 20a, 20b, 20c may be, for example, magnetic hard disks, solid-state hard disks, or other suitable data memory devices.

The data memory 20a of the receiving unit 12 stores a catalog of eyeglass lens classes comprising the eyeglass lens classes available in the system 10B and the parameters associated therewith. In contrast, only the highest eyeglass lens classes are stored in the data memory 20b of the processing unit. The catalog of eyeglass lens classes may be stored, for example, as in the system 10A, in the form of a computer-readable list, table, or database. The eyeglass lens classes may also each be stored in the form of a computer-readable list, table, or other suitable data structure.

Furthermore, the calculation model, on the basis of which and on the basis of the order data transmitted by the receiving unit 12, the processing unit 14 generates or creates the digital reproduction, i.e. a simulation of the ordered eyeglass lens, can be stored or saved in the data memory 20b.

In the data memory 20c of the production unit 16, a catalog of blanks, i.e., the semi-finished eyeglass lens parts for physical implementation of the ordered eyeglass lens, and manufacturing parameters are stored.

Analogously to the system 10A, incoming order data of an eyeglass lens is received at the receiving unit 12 and transferred to the processing unit 14 using XML, JSON, or another suitable format. After processing the order data in the processing unit 14 using the calculation model, the processing unit 14 transfers the digital reproduction, which may include the simulation data of the ordered eyeglass lens or may be a theoretical eyeglass lens, via the communication device 18 using XML, JSON, etc., to the production unit 16 for manufacturing the ordered eyeglass lens using a selected blank from the catalog of eyeglass lens blanks stored in the data memory 20c and using the manufacturing parameters relevant to the ordered eyeglass lens and the selected blank. It is also possible for the processing unit 14 to retrieve the catalog of blanks and the manufacturing parameters via the communication device 18.

Figure 3:
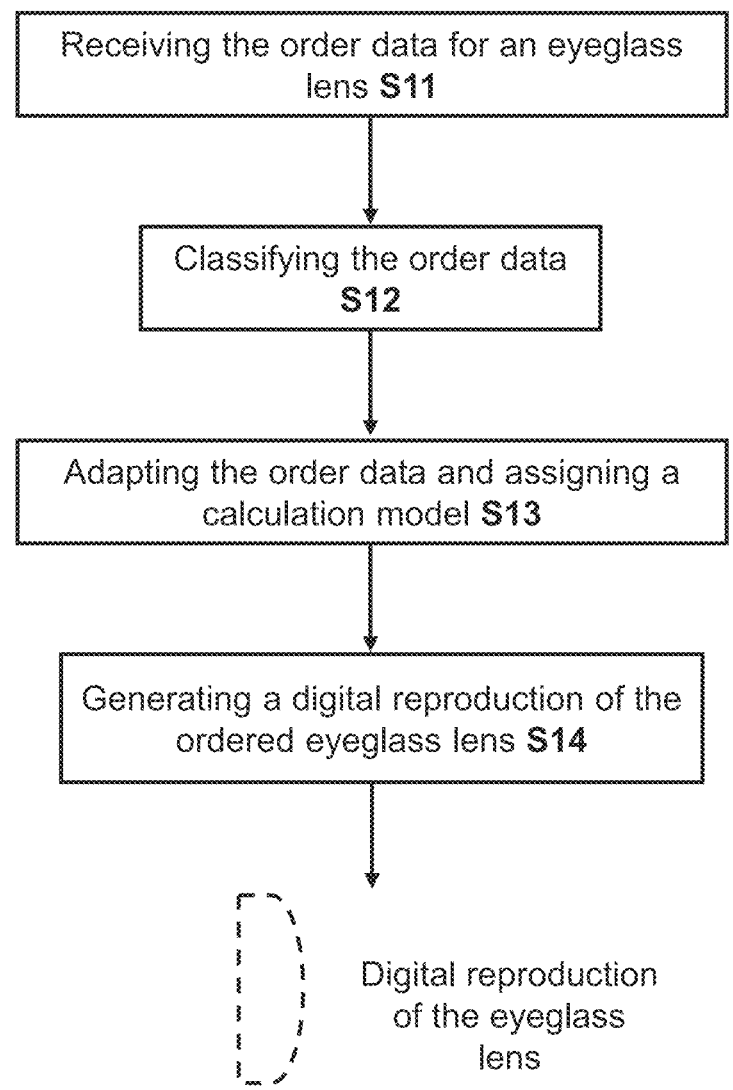

FIG. 3 shows an embodiment of the order-receipt processing method according to the fourth aspect of the invention. The method shown is performed by the system 10A shown in FIG. 1. In step S11, the receiving unit 12 receives the order data for an eyeglass lens to be manufactured, which is classified by the receiving unit 12 in step S12. Thereafter, the classified order data is handed over to the processing unit 14 via the communication device 18, and the order data is adapted to the selected highest eyeglass lens class, if necessary, that is, if the particular eyeglass lens class does not correspond to one of the highest eyeglass lens classes.

For example, the adaptation can include that the order data are extended by the missing parameters with set default values (see step S13). The order data is also assigned to a calculation model as described above (see step S13), which consists of the four modules design, eye model, calculation type and material. Based on the assigned calculation model and the order data, a digital reproduction, i.e. a simulation, of the ordered eyeglass lens is now generated in step S14. The resulting simulation data can be further processed as described below.

Figure 4:
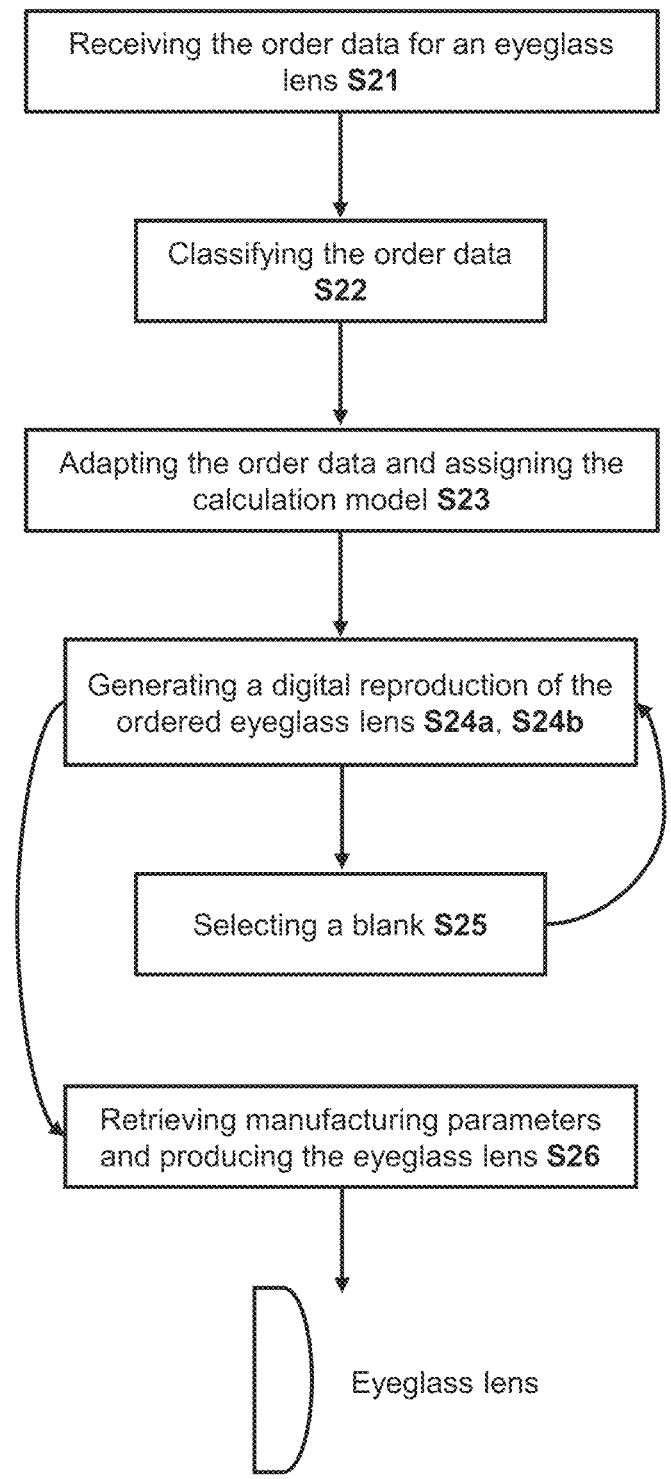

FIG. 4 shows an embodiment of the manufacturing method according to the sixth aspect of the invention. The method shown proceeds according to steps S21 to S26 and is performed by the system 10B shown in FIG. 2.

The receiving unit 12 receives the order data for an eyeglass lens to be manufactured in step S21, which is classified by the receiving unit 12 (step S22). Thereupon, the classified order data is transferred to the processing unit 14 via the communication device 18, and the order data is adapted to the selected highest eyeglass lens class, if necessary, that is, if the particular eyeglass lens class does not correspond to one of the highest eyeglass lens classes (step S23). For example, the order data can be adjusted by adding the missing parameters with default values set. The order data is further assigned (step S23) in the processing unit 14, as in the order-receipt processing method described above (see FIG. 3), to a calculation model composed of four modules including design, eye model, calculation type, and material. Based on the assigned calculation model and the order data, a digital reproduction, i.e. a simulation, of the ordered eyeglass lens is now generated approximately in step S24a. This simulation data is now used to select a blank for the eyeglass lens to be produced from the catalog of blanks in the production unit (step S25).

Using the selected blank, in particular with its characteristic data such as lens limitation, a renewed, accurate simulation of the ordered eyeglass lens is carried out in step S24b. After the renewed, accurate simulation, the respective manufacturing parameters are then retrieved (step S26) and the digital reproduction, which may include the simulation data, is handed over via the communication device 18 to the production unit 16 for manufacturing the ordered eyeglass lens (step S26).

Figure 5:
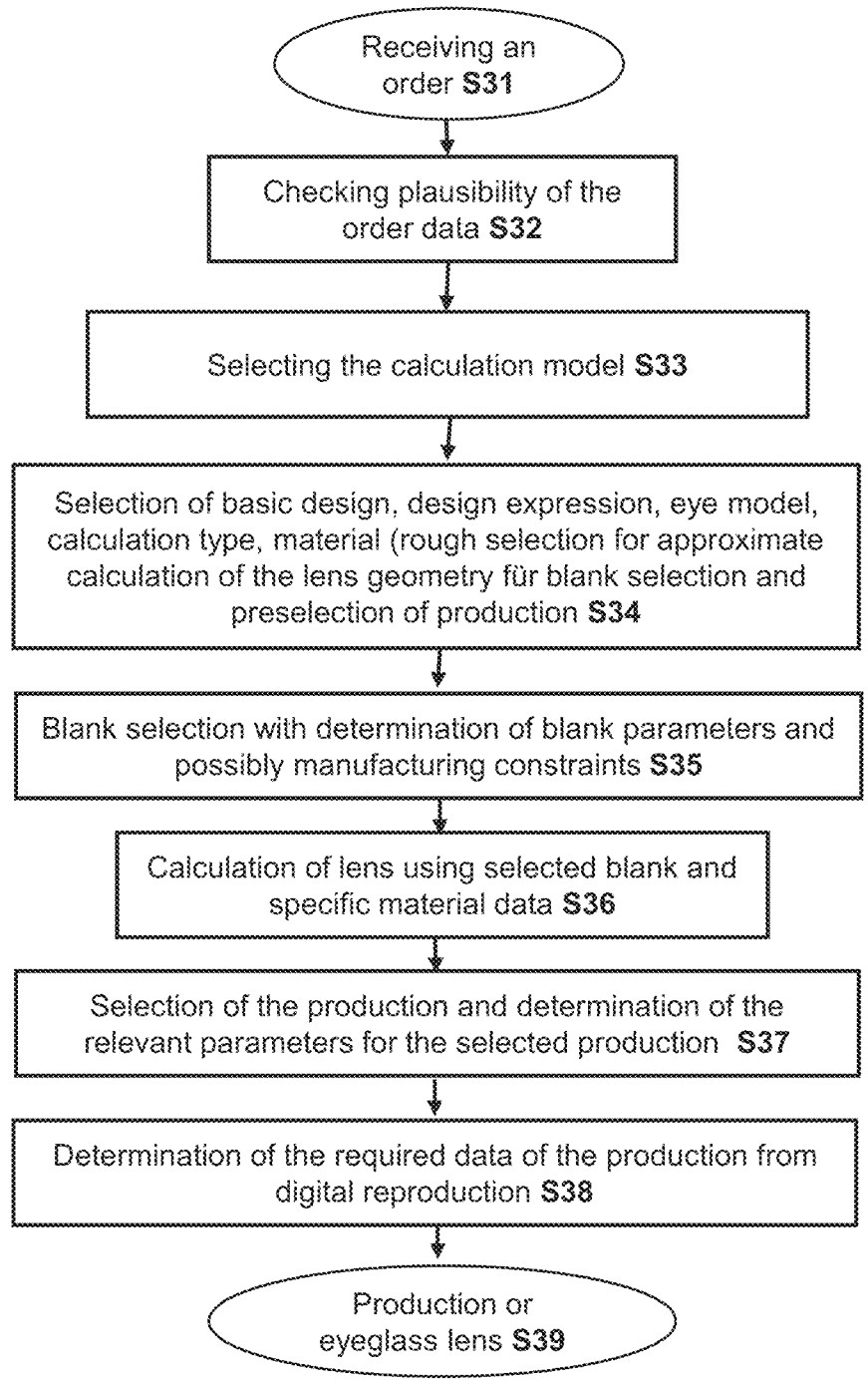

FIG. 5 shows a further possible embodiment of the manufacturing method according to the sixth aspect of the invention, which is carried out by the system 10B. In this embodiment, after receipt of the order data (step S31) of an eyeglass lens to be manufactured, a plausibility check of all order data for each product variant of the eyeglass lens takes place (step S32). This plausibility check is carried out, for example, on the basis of a customer- and/or market-specific lens catalog. The eyeglass lens catalog represents the allowed order parameters and the corresponding allowed variances of the order parameters. Order parameters that are not allowed are removed or marked as "not allowed" by the receiving unit 12 (classifying and cleansing the order data). An example of non-allowed ordering parameters are the individual parameters (such as pupil distance, corneal vertex distance, etc.) for a non-individual product. If order data is outside the allowed range, the order can be rejected or stopped for clarification and passed to customer service.

By removing the non-permitted parameters, it is not necessary to create all product variants in the processing unit 14, but only the product of the highest eyeglass lens class, which can be the highest individualization level, and to use default values or standard values for the parameters not contained in the order data, such as pupil distance, corneal vertex distance, etc., or for the parameters that may have been removed. The order data is enriched with these default values or standard values or extended with these if the corresponding parameter is not set in the order or was removed by the plausibility check. For example, only one individual product is defined in the processing unit 14, for which all individual parameters can be freely selected and/or within specified limits, and default or standard values are defined for the individual parameters, such as, for example, frame lens angle, pre-tilt, pupil distance, cornea vertex distance, etc.

Next, the order data is referred to a calculation model or assigned to a calculation model, alternatively also called calculation product in the following (step S33). By means of a set of rules, the ordered product variant of the eyeglass lens is analyzed within the processing unit 14 and referred to a calculation model. In contrast to the ordered product, the calculation model does not contain any information that is unnecessary for the calculation, for example the coloring of a lens. The calculation product can be described by a string, the name of the calculation product, or, if necessary, further parameters. The further parameters can be for example the customer or customer group, if different product characteristics are desired for different customers or customer groups. They may include also the market to be supplied if the requirement of the markets differ (for example the individual parameters in the European and Asian market). The calculation product is used, on the one hand, to perform an approximate calculation to determine the glass geometry for the selection of the blank, alternatively called blank in the following. Thus, order products of different materials can be assigned to a calculation product of a corresponding material. Also, the calculation product does not contain any reference to the blank geometry used. Furthermore, the calculation product only maps the highest eyeglass lens class, which can be the highest individualization level, of a product variant.

This means that a plurality of order products can be traced back to a significantly smaller number of calculation products. The mapping of the order data to the calculation product can be done in a set of rules, for example by a rule file. In the set of rules arbitrary logical operations can be defined. Furthermore, a self-defined domain-specific language (DSL), decision trees or tables can be represented in the set of rules. Through a general set of rules, which may be a rule file, a complex transformation of the product and/or order data may further be performed. An example of a transformation is the conversion of a reading glass ordered with near refraction to a near comfort glass with far refraction and addition. On the other hand, if the logic remains the same, it may be useful to store the necessary logic in a decision table. An example is the determination of the corresponding material from a product designation, if, for example, the material index of the ordered product is stored at a fixedly defined position of the product designation by a fixed key.

The calculation product here is divided or decomposed into the four independent modules of design, eye model, calculation type and material already described above, with the design being further divided into the dependent modules of basic design and design expression.

The mapping of the calculation product by the four independent modules can be given by a set of rules. For example, a simple table structure can unambiguously map the calculation product, which can additionally contain the calculation name, to the four modules. However, further rules can also be defined with the inclusion of further order data or further parameters of the calculation product. For example, with the help of a further attribute of the market to be supplied, the eye model could be selected between a European and an Asian one. Such a rule could be implemented in a further rule file independently of the name of the calculation product.

In step S34, an approximate calculation of a digital reproduction, which may be a theoretical eyeglass lens, of the ordered eyeglass lens is performed using the data from the four modules. The calculation can be performed according to a method known in the prior art.

From the digital reproduction, which may be a theoretical lens and which was created by the approximation calculation, relevant characteristic parameters for the selection of the blank and the preselection of the manufacturing, in particular the manufacturing location and/or the manufacturing means, are determined (step S34). The characteristic values can be transmitted to an inventory control system, which can be integrated in the production unit 16.

The enterprise resource planning system can be a stand-alone application in whole or in part. The application can be installed on one or more computer units or machines. XML, JSON or other suitable formats can be used as means of transmission.

The relevant parameters from the calculation for the blank selection can be, for example, the contour of the lens boundary, front and rear surfaces, and the position and orientation of the front and rear surfaces to each other. In addition, glass thicknesses, for example at the edge of the glass, can be transferred in order to effectively detect undercutting of the blank surfaces with the glass surfaces and to take this into account in the blank selection. Suitable representations for transfer can be the glass diameter for the contour, for example in the case of round glasses. For the surfaces, for example for spherical surfaces, it may be the curvature and for aspherical surfaces it may be a spline representation or reference to such a representation so that the representation can be loaded into a stored data set, for example a database. For position and orientation, it may be, for example, the center thickness of the blank and a representation of the rotation of the front to back surface, given, for example, by angles of a rotation matrix or Euler angles.

Other relevant parameters that do not originate from the calculation can be the order data and/or variables derived from it, such as the order diameter or the required diameter and/or the blanks associated with the order product. Several data records with different base curves can be generated in the calculation if the stock level of the blank is taken into account in the selection in the enterprise resource planning system, in order to be able to select an alternative in the event of a possible blank shortage in the enterprise resource planning system and thus enable faster delivery.

After the blank has been selected in the enterprise resource planning system (step S35), the parameters of the blank are transmitted to the processing unit 14. The parameters can be, for example, the contour of the boundary of the blank, the front and rear surfaces and their position and orientation relative to one another, and the blank material.

Furthermore, the enterprise resource planning system can carry out a preselection of the manufacture, in particular of the means of production, on the basis of, for example, production parameters and/or utilization parameters. For example, the processing of certain glass geometries, materials and/or layers may not be possible in all production locations, so that the production, in particular the production location and/or the means of production, can be preselected on the basis of certain parameters from the calculation and/or the order data and/or parameters derived therefrom (step S35).

Examples of the parameters from the calculation can be the average curvature and/or the maximum curvature or/and the minimum curvature of the surface to be produced as well as its orientation to the base curve determined for example by the rotation angles. Furthermore, the parameters may include, for example, the shape of the glass contour. By preselecting the fabrication, it is possible to transfer parameters describing the fabrication constraints of the selected fabrication to the processing unit 14. Furthermore, customer-, market- and/or product-specific constraints may also be possible, for example.

With the help of the data from the product components (see step S34), the blank characteristics and the possibly determined manufacturing restrictions and/or customer-, market- and/or product-specific restrictions, the ordered eyeglass lens is calculated in step S36 according to a method known in the prior art. The ordered eyeglass lens can be calculated by again generating a digital reproduction of the ordered eyeglass lens.

The corresponding material assigned to the calculation product is replaced by the blank material. With the help of the glass usage, new thickness specifications can be determined for the blank material, for example, for passing the static load test of the ISO standard.

After the eyeglass lens calculation, the digital reproduction, which can be a theoretical lens, of the ordered eyeglass lens is determined for the selected blank and the possible manufacturing constraints and/or customer-, market- and/or product-specific constraints. From this theoretical eyeglass lens, the relevant characteristic parameters for the selection of the manufacturing, for example for the selection of the manufacturing machines, are determined in step S37. These characteristic parameters may be transmitted to a workshop control unit, which may be another unit integrated in the production unit 16.

The workshop control may be, in whole or in part, a stand-alone application that may be installed on one or more computer units and/or machines.

After selecting the production, for example the production machines, in the workshop control, the required data of the production, for example input data of the production machines, are requested to the processing unit 14. Requests here may mean a transmission of the required data from the processing unit to the workshop control.

Relevant production parameters, for example the available block rings, machine parameters such as the geometry of the grinding tools, are transmitted to the processing unit 14.

Using the relevant manufacturing parameters, the required data of the manufacturing are calculated in step S38 from the theoretical eyeglass lens in the processing unit 14. Examples include the surface representations for the grinding and polishing machines, for example in tailor format, the positions of the engraving and stamp points, for example in the case of variable designs. The required data of the manufacturing can be transmitted to the workshop control and transferred to the manufacturing machines so that the eyeglass lens is manufactured.

In summary, the receiving unit 12 normalizes the order data record and deletes, among other things also depending on customers and markets, impermissible order parameters such as impermissible individualization parameters. Between the receiving unit 12 and the processing unit 14, an abstract calculation model, which may also be called a calculation product, is assigned to the ordered eyeglass lens by means of the set of rules described above. Individualization parameters of the highest eyeglass lens class, which may be the highest individualization level, are populated with default values or standard values, as the case may be. All data describing the product design, such as the half-part/blank/blank to be used, the position and design of the engravings, the position and design of the punches, the position of the measuring points, etc., are controlled and managed outside the processing unit 14 in the production unit 16 and transferred to the processing unit 14 as required.

The system 10A and the exemplarily described method for the order-receipt processing of an eyeglass lens make it possible, as already explained above, that orders for eyeglass lenses can be processed more easily and with less effort, that is, more cost-effectively and with less consumption of resources. In this case, resources refer to in particular the storage space of the data relevant for the production of the eyeglass lenses, such as different eyeglass lens classes. Further advantageously, the system 10A has a minimum of decentralization, so that maintenance of the system 10A is more efficient, in particular simpler. Furthermore, the individual units of the system 10A, receiving unit 12 and processing unit 14, can operate independently of each other, so that maximum flexibility is achieved in the system 10A and a simple procedure without iterations, loops or backtracks is achieved. Furthermore, new product variants and/or eyeglass lens classes can be introduced and/or generated in the system 10A with less effort. Due to the described procedure and the clear division of tasks between the units 12 and 14, the introduction times of the new product variants can be reduced.

The system 10B and the exemplary method described for manufacturing an eyeglass lens provide the same advantages as the system 10A and the method for order-receipt processing. Furthermore, eyeglass lenses can be manufactured more simply and yet more accurately with less effort, that is, at a lower cost and with less resource consumption. The system 10B also has a minimum of decentralization, so that maintenance of the system 10B is also more efficient, in particular simpler. Furthermore, the individual units of the system 10B, receiving unit 12, processing unit 14, and production unit 16, which may also include an enterprise resource planning system and a workshop control system as described above, can operate independently of each other so that maximum flexibility is achieved in the system 10B and a simple method for manufacturing an eyeglass lens without iterations, loops, or setbacks is achieved. Furthermore, new product variants and/or eyeglass lens classes can also be introduced and/or generated in the system 10B with less effort. Due to the clear division of tasks between the units 12, 14 and 16, the introduction times of the new product variants can be reduced.

LIST OF REFERENCE CHARACTERS

10A system for order-receipt processing
10B system for the manufacture
12 receiving unit
14 processing unit
16 production unit/calculation unit
18 communication device
20a, 20b, 20c data memory
S11 . . . S14 method steps
S21 . . . S26 method steps
S31 . . . S39 method steps

The invention claimed is:

1. A system for order-receipt processing of at least one eyeglass lens, comprising:
    a receiver configured to receive order data of at least one eyeglass lens, to store a catalog of eyeglass lens classes, which each are defined by a fixed number of predetermined and freely selectable order parameters and differ from one another in the number of freely selectable order parameters, and to classify the order data based on the catalog of eyeglass lens classes;
    a processor configured to process the order data, to store only the highest eyeglass lens classes of the catalog of eyeglass lens classes, to select one of the highest eyeglass lens classes, to adapt the order data to the selected highest eyeglass lens class, and to generate a respective digital reproduction of the at least one eyeglass lens based on a calculation model and the adapted order data; and
    a communication device that connects the receiver and the processor.

2. The system according to claim 1, wherein the receiver is configured to classify and cleanse the order data if the order data contains parameters, determined by the catalog of eyeglass lens classes, which are not allowed for the at least one eyeglass lens, wherein the order data is cleansed by removing the parameters that are not allowed.

3. The system according to claim 1, wherein the receiver and the processor each comprise their own data memories and/or the communication device comprises a network.

4. The system according to claim 1, wherein the calculation model comprises a plurality of mutually independent modules that include at least modules of design, eye model, calculation type, and material.

5. The system according to claim 1, wherein the order data is assignable to the calculation model.

6. The system according to claim 1, wherein the processor is configured to adapt the order data by populating the classified order data with default values or by extending the classified order data with default values.

7. A system for calculating at least one eyeglass lens of a pair of eyeglasses, comprising:
    the system according to claim 1; and a calculator configured to store a catalog of blanks, to and calculate the at least one eyeglass lens based on at least one blank from the catalog of blanks and the respective digital reproduction, wherein the communication device connects the receiver, the processor, and the calculator.

8. A system for producing at least one eyeglass lens, comprising:

the system according to claim 1, and a producer configured to store a catalog of blanks and a list of production parameters, and to produce the at least one eyeglass lens based on at least one blank from the catalog of blanks, the list of production parameters and the respective digital reproduction, wherein the communication device connects the receiver, the processor, and the producer.

9. The system according to claim 8, wherein the producer comprises its own data memory and/or wherein the communication device comprises a network.

10. The system according to claim 8, wherein the producer comprises a plurality of producers configured to produce the at least one eyeglass lens corresponding to the respective digital reproduction.

11. The system according to claim 7, wherein the processor is further configured to select the at least one blank from the catalog of blanks based on the respective digital reproduction.

12. A computer-implemented method for order-receipt processing of at least one eyeglass lens, wherein the method comprises:

receiving order data of at least one eyeglass lens;

classifying the order data based on a catalog of eyeglass lens classes, which each are defined by a fixed number of predetermined and freely selectable order parameters and differ from one another in the number of freely selectable order parameters;

selecting one of the highest eyeglass lens classes;

adapting the classified order data to the selected highest eyeglass lens class of the catalog of eyeglass lens classes, if the eyeglass lens class of the classified order data differs from the selected highest eyeglass lens class; and generating a respective digital reproduction of the at least one eyeglass lens based on a calculation model and the adapted classified order data.

13. The computer-implemented method according to claim 12, wherein the classifying includes cleansing the order data if the order data contains non-allowed parameters determined by the catalog of eyeglass lens classes for the at least one eyeglass lens, and the cleansing includes removing the non-allowed parameters.

14. The method according to claim 12, wherein the calculation model comprises at least four mutually independent modules that include design, eye model, calculation type, and material.

15. The method according to claim 12, wherein the method further comprises assigning the classified order data to the calculation model.

16. The method according to claim 12, wherein the adapting includes populating the classified order data with default values or extending the classified order data with default values.

17. A computer-implemented method for calculating at least one eyeglass lens, comprising:

the method according to claim 12;

selecting at least one blank from a catalog of blanks; and calculating the at least one eyeglass lens based on the at least one blank from the catalog of blanks and the respective digital reproduction.

18. A computer-assisted method for producing at least one eyeglass lens, comprising:

the method according to claim 12;

selecting at least one blank from a catalog of blanks and retrieving a list of production parameters; and producing at least one ordered eyeglass lens based on the respective digital reproduction, the at least one blank from the catalog of blanks, and the list of production parameters.

19. The computer-implemented method according to claim 17, wherein the at least one blank is selected from the catalog of blanks based on the respective digital reproduction.

20. A non-transitory computer program product comprising computer-readable instructions that, when loaded, cause one or more processors to perform the method according to claim 12.

* * * * *